Sept. 17, 1935.   G. J. PANNECOUCKE   2,014,633
REENFORCED WHEEL CONSTRUCTION
Original Filed March 31, 1931   3 Sheets-Sheet 1
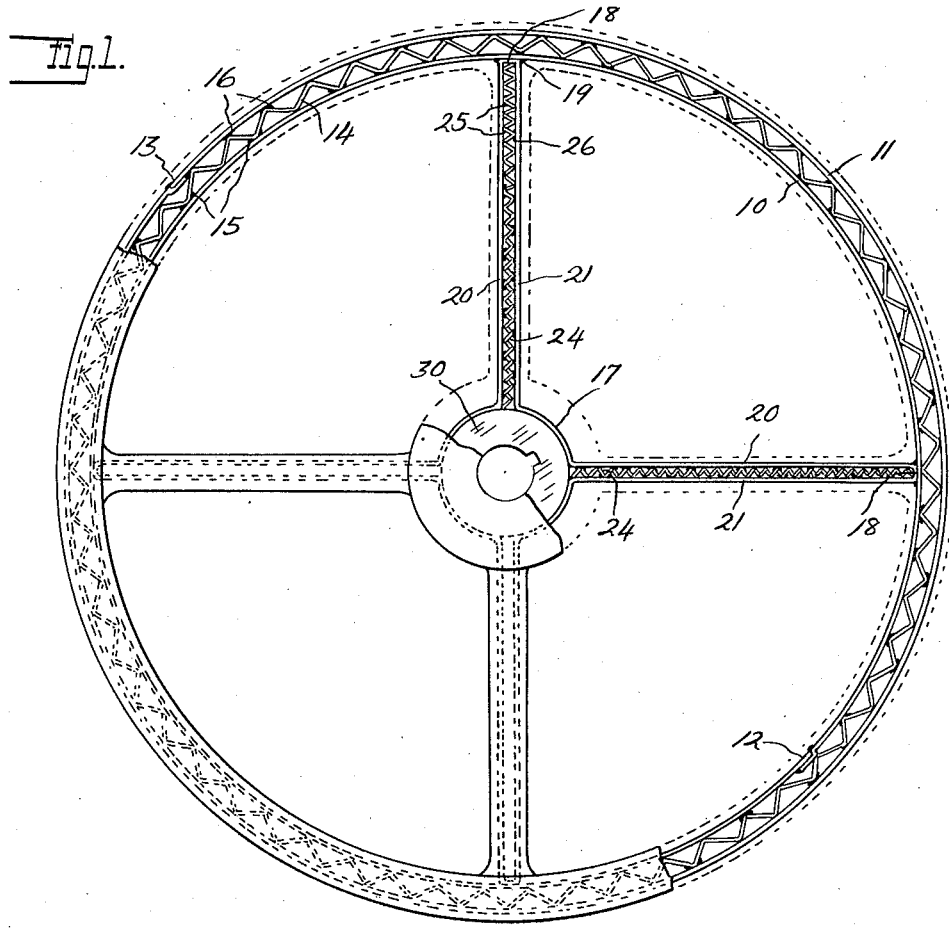
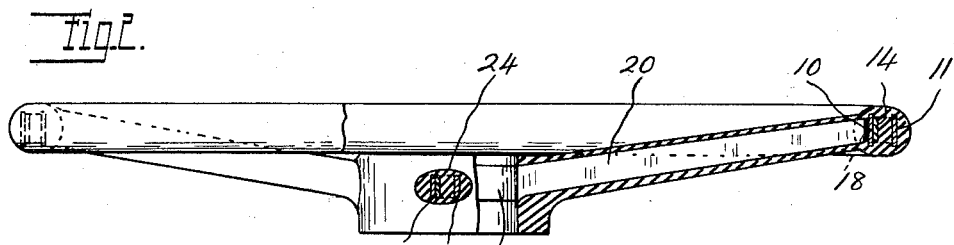
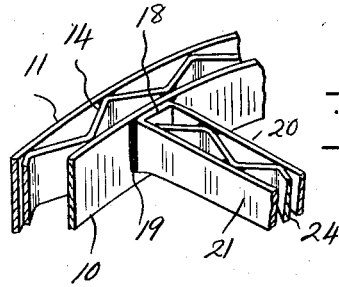
INVENTOR
Gregoire Joseph Pannecoucke
BY Swan & Frye
ATTORNEYS Sept. 17, 1935.  G. J. PANNECOUCKE  2,014,633
REENFORCED WHEEL CONSTRUCTION
Original Filed March 31, 1931    3 Sheets-Sheet 2
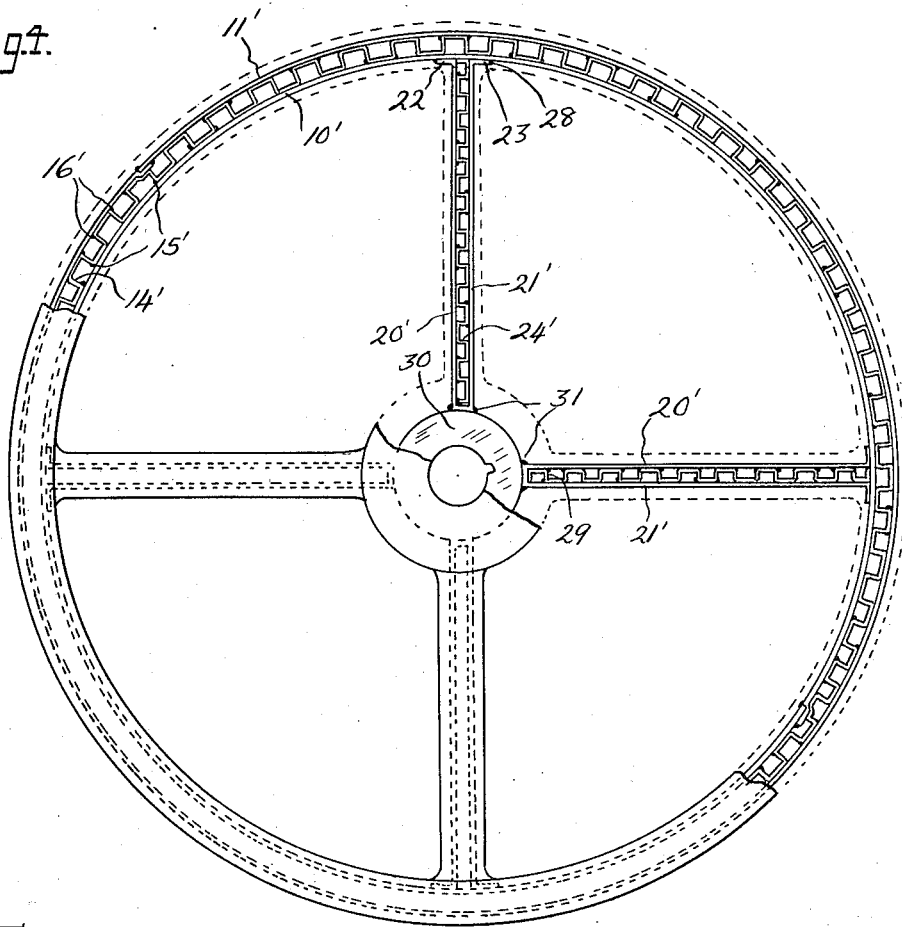
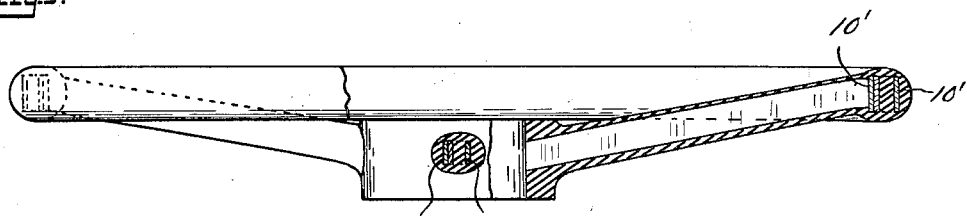
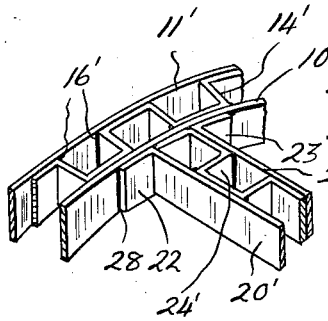
INVENTOR
Gregoire Joseph Pannecoucke
BY Swan & Frye
ATTORNEYS Sept. 17, 1935. G. J. PANNECOUCKE 2,014,633
REENFORCED WHEEL CONSTRUCTION
Original Filed March 31, 1931 3 Sheets-Sheet 3
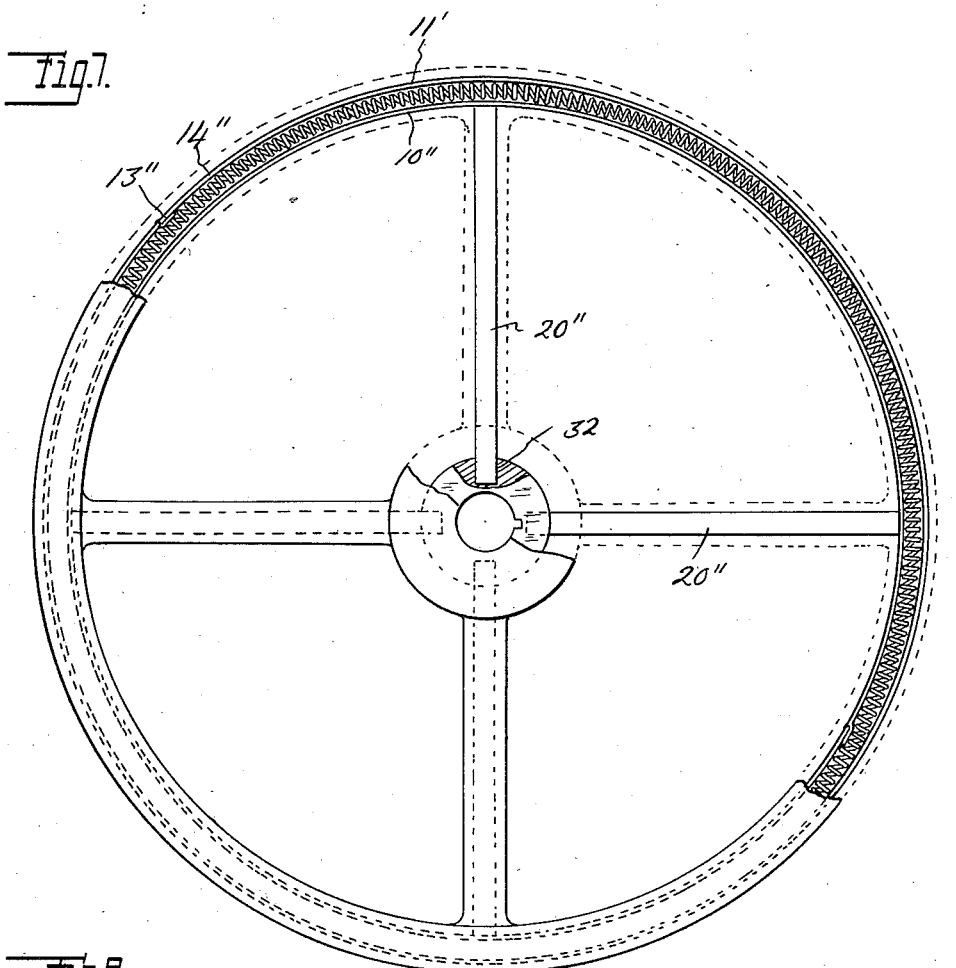
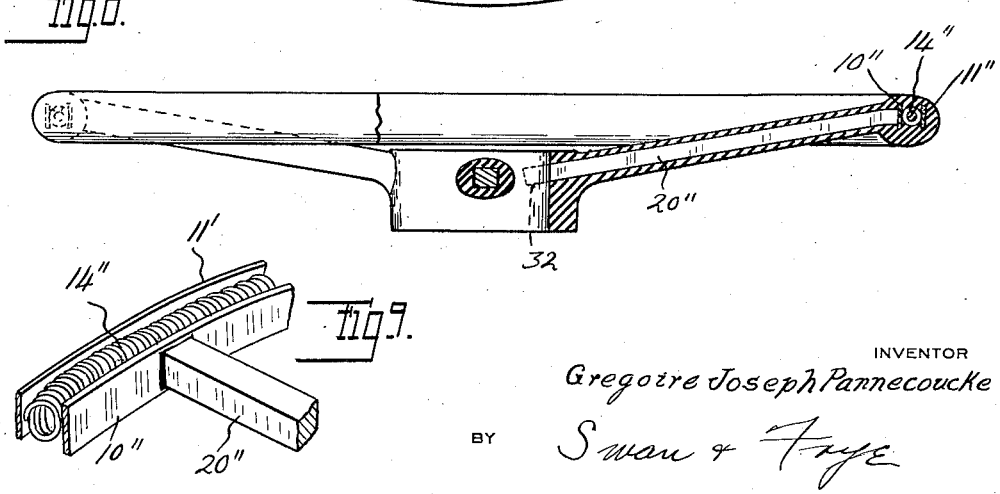
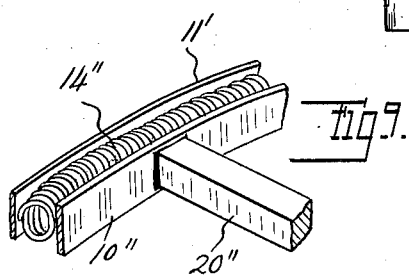
INVENTOR
Gregoire Joseph Pannecoucke
BY Swan & Frye
ATTORNEYS Patented Sept. 17, 1935

2,014,633

UNITED STATES PATENT OFFICE 2,014,633

REENFORCED WHEEL CONSTRUCTION

Gregoire Joseph Pannecoucke, Detroit, Mich.

Application March 31, 1931, Serial No. 526,657
Renewed July 20, 1933

1 Claim. (Cl. 74—552)

This invention relates to reenforced molded or other initially plastic compositions, and more particularly to a reenforced molded construction especially adaptable for use in the manufacture of steering wheels for automotive vehicles.

It has become common practice to form steering wheels of a molded composition in which various types of reenforcing members may be embedded. It is an object of this invention to provide a novel and improved type of reenforcement and frame construction suitable for forming the base of a molded covering with which the same is designed to cooperate to form a complete steering wheel structure.

It is a further object of this invention to provide such a reenforced steering wheel construction which will be of greater strength and rigidity than those now commonly made but in which the reenforcing frame will nevertheless be simple in form and of inexpensive manufacture.

Other objects and advantages will be apparent from the following description wherein reference is made to the accompanying drawings illustrating preferred embodiments of my invention, and wherein similar reference numerals designate similar parts throughout the several views.

In the drawings:

Figure 1 is a plan view of a steering wheel embodying one form of my invention, part of the molded composition being removed and broken away to show the interior construction of the frame and bracing members.

Figure 2 is a side view thereof partly in elevation and partly in section.

Figure 3 is a fragmentary perspective view of a portion of the frame and reenforcement, showing a meeting of one of the spokes and the annular portion which fits within the wheel.

Figure 4 is a view similar to Figure 1, showing a somewhat modified form of construction.

Figure 5 is a view similar to Figure 2 of such modified form of construction.

Figure 6 is a view, similar to Figure 3, of said modified form of construction.

Figure 7 is a view similar to Figure 1 of another modification of my invention.

Figure 8 is a view similar to Figure 2 of such modified form of construction, and Figure 9 is a view similar to Figure 3 of this modified form of construction.

Referring now to the drawings: As shown in Figure 1, I preferably form the frame for the wheel proper of my improved construction from a pair of annular ribbon-like or "flat wire" members, the inner of which is designated 10 and the outer 11. They may be formed as simple independent concentric rings, each having its ends lapped and welded, as at 12 and 13. The rings 10 and 11 are spaced from each other as shown in Figure 1, and within such space I preferably provide a reenforcing member having portions engaging both rings. The reenforcing member may take any of various forms. In Figure 1 the reenforcing member is designated 14 and is formed as a simple crenelated strip of flat wire which may be of the same width as the rings 10 and 11, as shown in Figure 2, and the peaks of which, forming the meeting points between the reenforcing strip and the rings, may be welded to the rings at a plurality of points, as 15 and 16 about the periphery of the wheel.

An alternate form which the crenelations of the reenforcing strip may take is shown in Figure 4. In this form greater welding surface is provided between the rings and the reenforcing strip at each meeting point. In this figure the reenforcing strip is designated 14', the inner and outer rings 10' and 11', and the inner and outer welded joints 15' and 16' respectively.

If desired, the reenforcing member between the rings may be formed of round or flat wire which is helically wound, as shown in Figure 7. In this figure similar reference numerals are used to those employed in the first two described embodiments, except that the double prime exponent is used. The welds between the coil-spring-like reenforcing member 14" and the rings may be at desired intervals about their peripheries, as shown at 15" and 16".

If desired the spoke construction may be similarly formed and reenforced. A suitable means of doing this in which all of the spokes are formed from a single strip is shown in Figure 1. The strip may be bent to form a central portion 17 adapted to fit about or within the hub of the wheel, and spaced portions 20 and 21 within which a reenforcing member 24 is adapted to fit. The reenforcing member 24 may be similarly formed to the member 14 in the rim of the wheel, being crenelated to fill the space between the portions 20 and 21 and welded at intervals thereto, as at 25 and 26. The portion 18, which forms the end of the spoke frame may be so curved as to substantially conform to the inner surface of the strip 10, and may be welded or otherwise suitably secured thereto, as at 19, (note Figure 3). The portions 20 and 21 may be inclined with respect to the portions 17, 18, as shown in Figure 3, in order that the rim portion of the wheel may be positioned higher than the hub in the conventional manner when the same is secured in place upon the steering post of a vehicle.

A somewhat modified spoke construction is shown in Figures 4, 5, and 6, in which it will be seen that the spokes are formed separately of individual strips of flat wire having spaced sides 20' and 21' between which a crenelated reenforcing strip 24' may be positioned in a similar manner. In this construction the ends of the strip are bent outwardly, as at 22 and 23, and suitably secured to the inner surface of the member 10', as by welding (28, Figure 6). The inner bight portion 29 of the U formed by the legs 20' and 21' may be bent to conform to the portion 30' of the hub of the wheel and welded thereto, as at 31.

If desired the reenforcement and supporting frame structure for the spokes may comprise solid bars, as 20'', secured to the hub at their inner extremities in any suitable manner, as by being driven into inclined apertures 32 therein, as shown in Figures 7 and 8. The outer ends of the bars 20 may be secured to the inner surface of the strip 10'' by welding, or in any other suitable fashion.

The disclosed wheel and spoke frames are of course interchangeable, as are also the various forms of reenforcements disclosed, and many variations and modifications will be readily apparent. The frame may be completely assembled in one of the manners disclosed, after which it may be entirely covered with any suitable molded, machined, or otherwise suitably finished composition, by means of which the wheel may be given its desired outward appearance and finish. Ordinarily a molded composition is employed which completely fills all spaces and interstices between the reenforcing and frame members to form a unitary structure.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claim.

What I claim is:

A wheel supporting and reenforcing structure comprising substantially concentric but spaced annular members, a reenforcing member between said annular members alternately engaging along its extent first one and then the other of the annular members, comprising a helically coiled wire secured to both annular members, and spoke members secured at their outer extremities to one of the annular members.

GREGOIRE JOSEPH PANNECOUCKE.